(12) United States Patent
Augestad et al.

(10) Patent No.: US 6,683,125 B1
(45) Date of Patent: Jan. 27, 2004

(54) TALC CONTAINING POLYPROPYLENE COMPOSITIONS

(75) Inventors: Morten Augestad, Skjelsvik (NO); Dag Tørå, Langesund (NO); Sveinung Aasetre, Stathelle (NO)

(73) Assignee: Borealis A/S, Lyngby (DK)

( * ) Notice: Subject to any disclaimer, the term of this patent is extended or adjusted under 35 U.S.C. 154(b) by 0 days.

(21) Appl. No.: 09/530,797

(22) PCT Filed: Nov. 9, 1998

(86) PCT No.: PCT/EP98/07216

§ 371 (c)(1),
(2), (4) Date: Jun. 13, 2000

(87) PCT Pub. No.: WO99/24501

PCT Pub. Date: May 20, 1999

(30) Foreign Application Priority Data

Nov. 7, 1997 (FI) .................................................. 974178

(51) Int. Cl.$^7$ .................................................. C08L 5/01
(52) U.S. Cl. ........................ 524/490; 524/451; 524/515; 524/518; 524/529; 524/536
(58) Field of Search .......................... 524/452, 81, 849, 524/515

(56) References Cited

U.S. PATENT DOCUMENTS

| | | | |
|---|---|---|---|
| 4,436,863 A | 3/1984 | Albee, Jr. et al. ............ 524/451 |
| 4,551,501 A | * 11/1985 | Shiga et al. .................. 525/88 |
| 4,603,174 A | * 7/1986 | Okada et al. ................ 525/240 |
| 4,696,979 A | * 9/1987 | Shiga et al. ................. 525/247 |
| 4,997,872 A | * 3/1991 | Ohmae et al. ............... 524/433 |
| 5,118,566 A | 6/1992 | Wilhelm et al. ............. 428/339 |
| 5,462,987 A | * 10/1995 | Shinonaga et al. .......... 524/451 |
| 5,591,795 A | * 1/1997 | Nomura et al. .............. 524/451 |
| 5,641,828 A | * 6/1997 | Sadatoshi et al. ........... 524/451 |
| 5,684,099 A | * 11/1997 | Watanabe et al. ........... 526/135 |
| 6,437,063 B1 | * 8/2002 | Karbasi et al. .............. 526/128 |
| 6,503,993 B1 | * 1/2003 | Houvinen et al. ........... 526/348.1 |

FOREIGN PATENT DOCUMENTS

| | | |
|---|---|---|
| EP | 0000783 A3 | 2/1979 |
| EP | 152701 | 8/1985 |
| EP | 265075 | 4/1988 |
| EP | 0152701 B1 | 6/1988 |
| EP | 0151883 B1 | 5/1989 |
| EP | 0586109 A2 | 3/1994 |
| EP | 0607703 B1 | 7/1994 |
| EP | 0627449 A1 | 12/1994 |
| EP | 0368577 B1 | 5/1995 |
| EP | 0417319 B1 | 10/1996 |
| JP | 3-163145 A | * 7/1991 ........... C08L/23/10 |
| JP | 10-36584 A | * 2/1998 |
| WO | WO 92/19653 | 11/1992 |
| WO | WO 92/19658 | 11/1992 |
| WO | WO 94/26794 | 11/1994 |
| WO | WO 95/12622 | 5/1995 |
| WO | WO 98/12234 | 3/1998 |

OTHER PUBLICATIONS

Translation of JP 10–36584 A.*
Derwent Publications Ltd., XP–002098803, Abstract of JP 01 204947 A, Aug. 17, 1989.
Gatcher, R. et al., "Taschenbunch der Kunststoff–Additive", 1990 Carl Hanser Verlag Munchen Wien, Germany, 3. edition, pp. 564–565; 584–585.
EP0000783—English language Abstract.
Masahiro Kakugo, et al., "Polypropylene Composition and Sheet Composed of the Same" Japanese Patent No. 62-135551 (A), Jun. 18, 1987—Abstract only.
Aida Jebens, et al., "Ethylene–Propylene Elastomers", Chemical Economic Handbook, Feb. 2000, vol. 6, pp. 544–559.

* cited by examiner

*Primary Examiner*—David W. Wu
*Assistant Examiner*—Rip A Lee
(74) *Attorney, Agent, or Firm*—Birch, Stewart, Kolasch & Birch, LLP

(57) ABSTRACT

The present invention concerns polymer compositions and a process for the preparation thereof. The compositions comprise a propylene polymer nucleated with a polymeric nucleating agent containing vinyl compound units, and 0.1 to 10% talc, calculated from the weight of the composition, to reduce shrinkage and to improve stiffness of the composition.

19 Claims, No Drawings

TALC CONTAINING POLYPROPYLENE COMPOSITIONS

This application is the national phase under 35 U.S.C. § 371 of PCT International Application No. PCT/EP98/07216 which has an International filing date of Nov. 9, 1998, which designated the United States of America.

BACKGROUND OF THE INVENTION

1. Field of the Invention

The present invention relates to polymer compositions. In particular, the present invention concerns compositions of efficiently nucleated copolymers. The invention further concerns a process for preparing such compositions. Finally, the present invention relates to the use of the new propylene polymers or copolymers for the manufacture of products by, e.g., blow moulding, thermoforming, injection moulding and sheet or film extrusion.

2. Description of Related Art

Propylene (PP) homo- and copolymers have excellent resistance to heat and chemicals as well as attractive mechanical properties, such as stiffness and impact resistance. However, processing of polypropylene by,.e.g., injection moulding, thermoforming or blow moulding, to form thin-walled containers has resulted in products having insufficient transparancy. This is caused by the semi-crystalline nature of polypropylene which leads to hazy quality end-products.

In the prior art it has been proposed to improve the transparency of blow moulded polypropylene by blending the polymer with various nucleating agents such as dibenzilidene sorbitol (DBS) or di(alkylbenzilidene)sorbitol. These traditional nucleating agents tend to bleed out from the polymer composition during processing and many of them give rise to fumes with an offensive smell. As a solution to these problems, it has been suggested in the art to use vinyl compounds, such as polymers of vinyl cycloalkanes and 3-methyl-1-butene, as nucleating agents in the form of propylene copolymers or polypropylene compounds, cf. EP Patent Specifications Nos. 0 152 701, 0 151 883, 0 368 577 and 0 417 319. However, studies done on these higly nucleated materials shows that, although their processing properties are excellent, shrinkage increases with increasing freezing point. Further, even though improved, the freezing point and stiffness of the polymer resins are still too low for many applications.

SUMMARY OF THE INVENTION

It is an object of the present invention to eliminate the problems related to the prior art and to provide a novel propylene polymer or copolymer composition having improved mechanical properties and therefore highly suited to the manufacture of moulded products.

A second object of the invention is to provide a novel process for preparing novel propylene copolymer compositions of the above kind.

It is still a further object of the present invention to provide moulded or extruded products comprising propylene copolymer compositions.

These and other objects, together with the advantages thereof over known processes and products, which shall become apparent from the specification which follows, are accomplished by the invention as hereinafter described and claimed.

The invention is based on the idea of employing talc as a shrinkage-reducing ingredient in propylene compositions, in particular in compositions containing propylene exhibiting a high degree of crystallinity and a high temperature of crystallization.

The use of talc in efficiently nucleated propylene compositions is known in the art. Thus, EP Patent Specification No. 0 152 701 discloses blending proplyene copolymer containing poly(vinyl cycloalkane) with a filler such as mica or talc. No examples of any kind of compositions containing talc are given nor does the specification give any concentration ranges for mica or talc. Considering the fact that talc is used as a filler, it would appear that amounts of several tens of percents have been contemplated.

Talc is also a well-known nucleating agent. EP Patent Application No. 0 586 109 describes a polypropylene composition containing 0.0001 to 1 part by weight of a crystal nucleating agent, such as talc. In the examples, the amount of talc is 0.2 parts by weight.

No indication of any beneficial effect of talc on the shrinkage of the polypropylene composition can be found in the above documents.

According to the present invention it has now been found that surprisingly good mechanical results are obtained by blending talc with propylene polymers which have been nucleated with a polymerized vinyl compound in amounts sufficient to obtain an increase of stiffness while reducing shrinkage to an acceptable level. Preferably 0.1 to 10 wt-% of talc is used. Surprisingly, although the stiffness of polypropylene nucleated with a polymerized vinyl compound is similar to that of polypropylene nucleated with 0.5% talc, the stiffness of the former will increase more than of the latter when both are blended with the same amount of talc (e.g. 2.5 to 5%).

More specifically, the polymer composition according to the present invention is characterized by what is stated in the characterizing part of claim 1.

The process according to the present invention for preparing nucleated polypropylene compositions is characterized by what is stated in the characterizing part of claim 9.

The present compositions can be used in any kind of polymer articles. Particular advantages are obtained by applying the compositions to the manufacture of moulded products, and products prepared by blow moulding, stretch blow moulding, injection moulding, compression moulding and sheet or film extrusion and pipe or cable extrusion.

The invention achieves a number of considerable advantages. In particular it can be noted that the addition of talc in amounts of 0.1 to 10 wt-% increases the stiffness of the propylene polymer composition by up to 5%. Talc in polypropylene compositions gives rise to higher tensile modulus than talc in standard PP copolymer. The Heat Deflection Temperature (the HDT value) is also increased by the addition of talk, and the HDT value increases more for the present polypropylene compositions nucleated with a vinyl compound than for standard PP. The crystallization temperature of the present compositions is higher than for standard PP containing corresponding amounts of talc and for polypropylene compositions nucleated with a vinyl compound. Although the shrinkage of the present compositions is somewhat higher than that of standard PP containing talc it is still on an acceptable level and the present invention provides a unique combination of excellent stiffness (up to 1600 MPa or more), controlled shrinkage, faster crystallization and high $T_{cr}$ giving good cyclus potential. In the present context, faster crystallization is not necessarily related to faster formation of single crystals but rather to the fact that there are more crystals that fill the space faster.

Next, the invention will be more closely examined with the aid of the following detailed description.

DETAILED DESCRIPTION OF THE INVENTION

The compositions of the present invention include a polymeric component comprising a propylene polymer nucleated with vinyl compounds together with a shrinkage-restricting component, talc. By nucleating propylene polymers with vinyl compounds it is possible to provide polypropylene having a higher degree of crystallinity, a higher crystallization temperature, smaller crystallization size and a greater crystallization rate. These kinds of compositions can be used for the preparation of moulded products. They exhibit improved physical properties.

The nucleation of the propylene polymers can be carried out by modifying the polymerization catalyst with vinyl compounds and using the modified catalyst for polymerization of propylene optionally in the presence of comonomers to provide a propylene polymer or copolymer containing about 0.0001 to 1% (calculated from the weight of the composition) of a polymer comprising vinyl compound units. Another approach for nucleating propylene polymers comprises blending polypropylene with polymers containing vinyl compound units.

For the purpose of the present invention "vinyl compounds" are compounds having the formula I

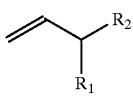

wherein $R_1$ and $R_2$ together form a 5 or 6 membered saturated or unsaturated or aromatic ring or they stand independently for a lower alkyl comprising 1 to 4 carbon atoms.

The following specific examples of vinyl compounds can be mentioned: vinyl cycloalkanes, in particular vinyl cyclohexane, vinyl cyclopentane, vinyl-2-methyl cyclohexane and vinyl norbornane, 3-methyl-1-butene, styrene, p-methyl-styrene, 3-ethyl-1-hexene or mixtures thereof. Vinyl cyclohexane (VCH) is a particularly preferred monomer but, for example 3-methyl-1-butene can be used as a monomer or comonomer to adjust the crystallisation temperature.

For the purpose of the present invention "nucleated propylene polymer" stands for a polymer having an increased and controlled degree of crystallinity and preferably having a crystallization temperature of more than 7° C., preferably over 10° C. and in particular over 13° C. of the $T_{cr}$ of the corresponding non-nucleated polymer. Using $MgCl_2$-supported high-yield Ziegler-Natta catalysts crystallization temperatures of more than 120° C., preferably over 124° C. and in particular over 126° C. can be obtained. In compositions containing colouring pigments having a nucleating effect, particularly advantageous results are obtained by using polymers having a crystallization temperature over 15° C. higher than that of the corresponding non-nucleated polymer (for a polymer produced with the above-mentioned ZN-catalyst, 128° C.).

According to a preferred embodiment of the present invention, modification of the catalyst with by polymerizing a vinyl compound, such as VCH, in the presence thereof is performed in an inert fluid which does not dissolve the polymer formed (e.g. polyVCH). One particularly preferred polymerization medium comprises a viscous substance, in the following a "wax", such as an oil or a mixture of an oil with a solid or semi-solid polymer (oil-grease). The viscosity of such a viscous substance is usually 1,000 to 15,000 cP at room temperature. The advantage of wax prepolymerization is that the catalyst can be prepolymerized, stored and fed into the process in the same media and catalyst wax preparation and prepolymerization is performed in the same process device. Due to the fact that no washing, drying, sieving and transferring thus are needed, the catalyst activity is maintained (cf. Finnish Patent No. 95387). The present process is inexpensive because high catalyst concentrations and high PP production capacities can be used. Also the amount of waste is diminished because the medium used during polymerization of the vinyl compound does not have to be removed.

According to another preferred embodiment, the method for improving the crystallinity and transparency of polypropylene by blending a crystalline polypropylene with a vinyl cycloalkane polymer is carried out by melt-kneading the crystalline polypropylene with the crystal nucleating agent, compounding the crystal nucleating agent with the crystalline polypropylene and melt kneading the mixture during film formation, and compounding the master batch of the crystal nucleating agent with the crystalline polypropylene.

The vinyl compound units of the blending and compounding process can be derived from any of the units identified in the above formula I in connection with the first embodiment of the invention.

As catalyst any stereospecific catalyst for propylene polymerization can be used, which is capable of catalyzing polymerization and copolymerization of propylene and comonomers at a pressure of 10 to 100 bar, in particular 25 to 80 bar, and at a temperature of 40 to 110 ° C., in particular 60 to 100° C. Ziegler-Natta as well as metallocene catalysts can be used.

Generally, the Ziegler-Natta catalyst used in the present invention comprises a catalyst component, a cocatalyst component, an external donor, the catalyst component of the catalyst system primarily containing magnesium, titanium, halogen and an internal donor.

Examples of suitable catalyst systems are described in, for example, Finnish Patents Nos. 86866, 96615 and 88047 and 88048.

One particularly preferable catalyst, which can be used in the present invention, is disclosed in FI Patent No. 88047. Another preferred catalyst is disclosed in Finnish Patent Application No. 963707.

A catalyst system useful in the present process can be prepared by reacting a magnesium halide compound with titanium tetrachloride and an internal donor. The magnesium halide compound is, for example, selected from the group of magnesium chloride, a complex of magnesium chloride with a lower alkanol and other derivatives of magnesium chloride. $MgCl_2$ can be used as such or it can be combined with silica, e.g. by absorbing the silica with a solution or slurry containing $MgCl_2$. The lower alkanol used can be preferably methanol or ethanol, particularly ethanol.

The titanium compound used in the preparation of the procatalyst is preferably an organic or inorganic titanium compound, having an oxidation state of titanium of 3 or 4. Also other transition metal compounds, such as vanadium, zirconium, chromium, molybdenum and tungsten compounds can be mixed with the titanium compound. The titanium compound usually is halide or oxyhalide, an organic metal halide, or a purely metal organic compound, in which only organic ligands have been attached to the transition metal. Particularly preferable are the titanium halides, especially TiCl$_4$. Preferably the titanation is carried out in two or three steps.

The Ziegler-Natta catalyst used can also be an heterogeneous unsupported TiCl$_3$ based catalyst. This kind of catalysts are typically solid TiCl$_5$ in a delta crystalline form which are activated with aluminium-chloride-alkyls, such as diethylaluminiumchloride. The solid TiCl$_3$ catalyst are typically prepared by reduction of TiCl4 with aluminium-alkyls and/or aluminium-chloride-alkyls, possibly combined with heat treatment to maximise the desired delta crystalline form of TiCl$_3$. The performance, especially stereospecificity, of these catalyst can be improved by using Lewis-bases (electron donors), such as esters, ethers or amines.

The activity and stereospecificity of these heterogeneous unsupported TiCl$_3$ based catalysts are typically so low that propylene polymers or copolymers prepared require purification from catalyst residues and removal of some atactic non-crystalline polymer.

The alkoxy group of the phthalic acid ester used comprises at least five carbon atoms, preferably at least 8 carbon atoms. Thus, as the ester can be used for example propylhexyl phthalate, dioctyl phthalate, dinonyl phthalate, diisodecyl phthalate, di-undecyl phthalate, ditridecyl phthalate or ditetradecyl phthalate.

The partial or complete transesterification of the phthalic acid ester can be carried out e.g. by selecting a phthalic acid ester—a lower alcohol pair, which spontaneously or with the aid of a catalyst, which does not damage the procatalyst composition, transesterifies the catalyst at an elevated temperatures. It is preferable to carry out the transesterification at a temperature, which lies in the range of 110 to 150° C., preferably 120 to 140° C.

The catalyst prepared by the method above is used together with an organometallic cocatalyst and with an external donor. Generally, the external donor has the formula IV

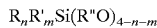

wherein

R and R' can be the same or different and they stand for a linear, branched or cyclic aliphatic, or aromatic group;

| | |
|---|---|
| R" | is methyl or ethyl; |
| n | is an integer 0 to 3; |
| m | is an integer 0 to 3; and |
| n + m | is 1 to 3. |

The aliphatic groups in the meanings of R and R' can be saturated or unsaturated. Linear $C_1$ to $C_{12}$ hydrocarbons include methyl, ethyl, propyl, butyl, octyl and decanyl. As examples of suitable saturated branched $C_{1-8}$ alkyl groups, the following can be mentioned: isopropyl, isobutyl, isopentyl, tert-butyl, tert-amyl and neopentyl. Cyclic aliphatic groups containing 4 to 8 carbon atoms comprise, e.g., cyclopentyl, cyclohexyl, methyl cyclopentyl and cycloheptyl.

A group of interesting donors is formed by strongly co-ordinating donors which form relatively strong complexes with catalyst surface, mainly with MgCl$_2$ surface in the presence of aluminium alkyl and TiCl$_4$. The donor components are characterised by a strong complexation affinity towards catalyst surface and a sterically large and protective hydrocarbon (R'). Such external donors can be selected from the group consisting of dicyclopentyl dimethoxysilane, diisopropyl dimethoxysilane, di-isobutyl dimethoxysilane, and di-t-butyl dimethoxysilane.

An organoaluminum compound is used as a cocatalyst. The organoaluminium compound is preferably selected from the group consisting of trialkylaluminium, dialkyl aluminium chloride and alkyl aluminium sesquichloride.

The metallocene catalyst comprises a metallocene/activator reaction product impregnated in a porous support at maximum internal pore volume. The catalyst complex comprises a ligand which is typically bridged, and a transition metal of group IVA . . . VIA, typically a metal halide, and aluminium alkyl. The ligands can belong to group of heterocyclic substituted or unsubstituted compouns, e.g. indocenes, naftenes, or any other bulky compound which can control the stereoselectivity of the catalyst especially when ligands are bridged together with silane or other chemical bond. The activator is selected from a group in which are derivates of water and aluminium alkyls e.g. trimethyl aluminium, triethyl aluminium, and tri t-butyl aluminium, or another compound capable of activating the complex. The metallocene/activator reaction product, a solvent capable of dissolving it, and a porous support are brought into mutual contact, the solvent is removed and the porous support is impregnated with the metallocene/activator reaction product, the maximum amount of which corresponds to the pore volume support, cf. International PCT Application No. PCT/FI94/00499.

One typical structure of metallocene compound reactions is bridged bis(2-R-4-R'-indenyl) M Cl$_2$, wherein both R and R' are aliphatic, cycloaliphatic or aromatic hydrocarbons having 1 to 18 C atoms, R' is typically phenyl or naphthyl, and R is typically methyl or ethyl. M is a transition metal, typically titanium, zirconium or hafnium. R and R' may contain heteroatoms, such as silicon, nitrogen, phosphorous or germanium. The bridge between the indenyls is made from 1 to 3 atoms, such as carbon, silicon, nitrogen, phosphorous or germanium. A typical bridge is dimethylsilyl or ethyl. An example of such a metallocene compound is dimethylsilyl-bis(2-methyl-4-phenyl-indenyl)zirconium dichloride.

Following the modification of the catalyst with the vinyl compound of the first preferred embodiment of the invention, the catalyst is optionally prepolymerized with propylene and/or another 1-olefin to provide a prepolymerized catalyst composition which is used for polymerization of propylene optionally together with comonomers.

The propylene homo- or copolymer can have a unimodal or bimodal molar mass distribution. Thus, the equipment of the polymerization process can comprise any polymerization reactors of conventional design for producing propylene homo- or copolymers. For the purpose of the present invention, "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt-% monomer. According to a preferred embodiment the slurry reactor comprises a bulk loop reactor. By "gas phase reactor" is meant any mechanically mixed or fluid bed reactor. Preferably the gas phase reactor comprises a mechanically agitated fluid bed reactor with gas velocities of at least 0.2 m/sec.

Thus, the polymerization reactor system can comprise one or more conventional stirred-tank slurry reactors, as described in WO 94/26794, or one or more gas phase reactors. Preferably the reactors used are selected from the group of loop and gas phase reactors and, in particular, the process employs at least one loop reactor and at least one gas phase reactor. This alternative is particularly suitable for producing bimodal polypropylene. By carrying out the polymerization in the different polymerization reactors in the presence of different amounts of hydrogen, the MWD of the product can be broadened and its mechanical properties improved. It is also possible to use several reactors of each type, e.g. one loop reactor and two or three gas phase reactors or two loop reactors and one gas phase reactor, in series.

In every polymerization step it is possible to use also comonomers selected from the group of ethylene, propylene, butene, pentene, hexene and alike as well as their mixtures.

In addition to the actual polymerization reactors used for producing the propylene homo- or copolymer, the polymerization reaction system can also include a number of additional reactors, such as pre- and/or postreactors. The prereactors include any reactor for prepolymerizing the catalyst with propylene and/or other 1-olefins. The postreactors include reactors used for modifying and improving the properties of the polymer product. All reactors of the reactor system are preferably arranged in series.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier. The fluidized gas phase reactor can be equipped with a mechanical mixer.

The gas phase reactor used can be operated in the temperature range of 50 to 115° C., preferably between 60 and 110° C. and the reaction pressure between 5 and 50 bar and the partial pressure of monomer between 2 and 45 bar.

The pressure of the effluent, i.e. the polymerization product including the gaseous reaction medium, can be released after the gas phase reactor in order optionally to separate part of the gaseous and possible volatile components of the product, e.g. in a flash tank. The overhead stream or part of it is recirculated to the reactor.

The propylene homo- or copolymer produced preferably has a MWD of over 2 to 10 and a $MFR_2$ in the range of 0.01 to 1000 g/10 min, preferably 0.05 to 500 g/10 min, measured by ISO 1133, 230° C., 2.16 kg load.

In the second embodiment of the invention, wherein a uni- or bimodal propylene homo- or copolymer is blended and compounded with a polymer comprising vinyl compound units, the blending is carried out as known in the art using said nucleating polymeric agent.

By means of both embodiments, a propylene homopolymer or copolymer is produced having high stiffness, an increased overall degree of crystallization and a crystallization temperature measured with DSC of more than 7° C., preferably over 10° C. and in particular 13° C. higher than that of the corresponding non-nucleated polymer. The degree of crystallization for the propylene homopolymer is generally over 48%, often over 50 %, and the elasticity modulus is about 2,000 MPa or more. The elasticity modulus of heterophasic copolymers containing about 12 wt-% of a rubbery component is about 1,500 MPa or more.

If desired, the polymerization product can be fed into a gas phase reactor in which a rubbery copolymer is provided by a (co)polymerization reaction to produce a modified polymerization product. This polymerization reaction will give the polymerization product properties of e.g. improved impact strength. The step of providing an elastomer can be perfomed in various ways. Thus, preferably an elastomer is produced by copolymerizing at least propylene and ethylene into an elastomer. The conditions for the copolymerization are within the limits of conventional EPM production conditions such as they are disclosed, e.g., in Encyclopedia of Polymer Science and Engineering, Second Edition, Vol. 6, p.545–558. A rubbery product is formed if the ethylene repeating unit content in the polymer lies within a certain range. Thus, preferably, ethylene and propylene are copolymerized into an elastomer in such a ratio that the copolymer contains from 10 to 70% by weight of ethylene units. In particular, the ethylene unit content is from 30 to 50% by weight of the amorphous copolymer propylene/ethylene elastomer. In other words, ethylene and propylene are copolymerized into an elastomer in a molar ratio of ethylene-to-propylene of 30/70 to 50/50. Polymers modified by adding the rubbery copolymer in a gas phase reactor are typically called polypropylene block copolymers or heterophasic copolymers.

The amount of the nucleating polymeric agent is, in case of propylene copolymers, about 0.0001 to 1 wt-%, and in case of polypropylene blends about 0.0001 to 0.5 wt-%.

This nucleated polypropylene is then blended with talc in an amount of 0.1 to 10 wt-%, preferably about 0.5 to 9 wt-%, in particular 1 to 8 wt-% (calculated from the total weight of the composition). The talc used has a particle size in the range of of 0.01 to 100 μm, preferably 0.1 to 10 μm.

The present blends can be produced by methods known per se, e.g. by mixing the polymer components with the talc in the desired weight relationship using a batch or a continuous process. As examples of typical batch mixers, the Banbury and the heated roll mill can be mentioned. Continuous mixers are exemplified by the Farrel mixer, the Buss co-kneader, and single- or twin-screw extruders.

A composition according to the invention containing some 1 to 8 wt-% talc exhibits at least about 10%, preferably about 12% to about 25%, lesser shrinkage than the corresponding composition not containing talc. This decreased shrinkage is manifested particularly transverse to flow direction. Too high talc loading will impair a further increase of stiffness and restrict shrinkage below the lower tolerance of the moulds conventionally used for processing in the melt stage.

As mentioned above, the mechanical properties of polymer compositions according to invention are generally good to excellent. Thus, with a loading of 1 to 8 wt-% talc, a polymer composition of a heterophasic propylene copolymer containing about 12% of a rubbery component will have a stiffness (tensile modulus) of over 1500 MPa and a HDT of over 106° C. Generally, a loading of 2.5% talc will increase the tensile modulus from, e.g., 1440 MPa to 1600 MPa and a loading of 5% will further increase the tensile modulus to 1750 MPa (tensile modulus measured by using ISO 527-2). Impact properties are not influenced by the addition of talc in the range indicated, in particular if the amount of talc is less than 5%.

The homopolymer or copolymer composition thus obtained can be used for the manufacture of moulded articles, in particular articles processed by blow moulding, thermoforming, injection moulding and sheet or film extrusion, or pipe or cable extrusion. The compositions of the invention are particularly suitable for pipes and fitting for non-pressure sewage or pressure application, and buffer tubes, e.g. for optical fibres, wherein the amount of polymerized vinyl compound in the propylene polymer is less than 0.01 wt-%.

EXAMPLES

The following non-limiting examples illustrate the invention.

Example 1

Catalyst Modification with Polymerisation of Vinylcycloalkane

A high yield $MgCl_2$ supported $TiCl_4$ Ziegler-Natta catalyst prepared according to Finnish patent FI 88047 was dispersed into a mixture of oil and grease (Shell Ondina Oil N 68 and Fuchs Vaseline Grease SW in 3.2:1 oil/grease volume ratio). The titanium content of the catalyst was 2.5 wt-%, and the concentration of the catalyst in the oil/crease mixture was 189 g cat/$dm^3$. Triethylaluminium (TEAL) was added to the catalyst dispersion in a TEAL to titanium mole ratio of 1.5. After that vinylcyclohexane (VCH) was added to the reaction mixture, and the VCH to catalyst weight ratio was 1:1. The reaction mixture was mixed at a temperature of 55° C. until the concentration of unreacted VCH in the reaction mixture was 1000 ppm by weight.

Example 2

Copolymerisation of Propylene and Ethylene

The modified catalyst in the oil-grease mixture (catalyst mud) obtained from Example 1 was continuously fed to process consisting from a loop rector and a fluid bed gas phase rector together with TEAL, dicyclopentyldimethoxysilane and propylene.

The TEAL and dicyclopentyldimethoxysilane at a weigth-to-weigth ratio of 3.2 was contacted before mixing with the catalyst mud. After that the mixture was flushed with propylene, containing the desired amount of hydrogen as molecular weight regulating agent, to a continuous stirred prepolymerisation reactor. After the prepolymerisation, the reaction mixture together with additional propylene and hydrogen was fed to a continuous loop reactor operating at 68° C. The resulted PP homopolymer-propylene slurry containing the catalyst was continuously recovered from the loop reactor to a flashing unit where the liquid propylene was vaporised and the remaining solid polymer particles, containing the active modified catalyst, was further fed to a continuous fluidised bed gas phase reactor where a rubbery propylene ethylene copolymer for impact modification was produced. The gas phase reactor was operated at 77° C. The desired amount of propylene and ethylene was continuously fed to the reactor, and the molecular weight of the copolymer produced was controlled with desired amount of hydrogen. The final polymer was continuously recovered from the gas phase reactor. After purging the unreacted monomers, the required stabilisers and other additives were added and the polymer powder was pelletised with an extruder.

The final polymer had an $MFR_2$ of 15 g/10 min, and an ethylene content of 8 wt-%. The amount of polymer precipitated with acetone (AM) from solubles in 23° C. xylene (XS) was 13.9 wt-%, which corresponds to the amount of rubbery copolymer made in the gas phase reactor. The $MFR_2$ of the polymer recovered from the loop reactor was 20 g/10 min. The ethylene content of the polymer precipitated with acetone from solubles in 23° C. xylene was 37.4 wt-%. The polymer solubles in xylene at 25° C. were measured by dissolving the polymer in xylene at 135° C., and allowing the solution to cool to 25° C. and filtering then the insoluble part out. The amorphous part, AM, was measured by separating the above xylene soluble fraction and precipitating the amorphous part with acetone.

Example 3

Blending of Nucleated PP with Talc

The nucleated polypropylene prepared according to Example 2 was blended with talc and compounded in a extruder. The stiffness of the present compositions were compared with those of a standard nucleated PP copolymer. The nucleation agent of the standard copolymer was talc (<0.5%) or Sodium Benzoate (<0.1%).

Tensile modulus were measured according to ISO 527-2:

|  |  | Shrinkage |
|---|---|---|
| Standard PP polymer | Tensile modulus 1,400 MPa | 1.47% |
| Standard PP copolymer + 3% talc | Tensile modulus 1,420 MPa | 1.38% |
| Copolymer of Example 2 | Tensile modulus 1,400 MPa | 1.70% |
| Copolymer of Example 2 + 3% talc | Tensile modulus 1,600 MPa | 1.59% |

Shrinkage is measured from open top containers according to Borealis "Injection moulding application method 4".

The results show that by blending a copolymer nucleated with polymerized vinyl compounds and talc a surprising increase in the tensile modulus can be obtained; the propylene copolymer of Example 2 responded to talc with much higher modulus than the standard PP copolymer. The shrinkage values show that the invention provides a unique combination of excellent stiffness and controlled shrinkage.

Example 4

The Effect on HDT and Tc

The nucleated polypropylene prepared according to Example was blended with talc and compounded in a extruder. The stiffness of the present compositions were compared with those of a standard nucleated PP copolymer. The nucleation agent of the standard copolymer was talc (<0.5%) or Sodium Benzoate (<0.1%).

Heat Deflection Temperature (HDT) was measured according to ISO- 75-2 (method B/0.45 MPa).

Temperature of crystallisation was measured with differential scanning calorimeter (DSC) at a cooling rate of 10° C./min.

| Standard PP copolymer | HDT 100° C. $T_{cr}$ 123° C. |
|---|---|
| Standard PP copolymer + 3% talc | HDT 104° C. $T_{cr}$ 127° C. |
| Copolymer of Example 2 | HDT 103° C. $T_{cr}$ 129° C. |
| Copolymer of Example 2 + 3% talc | HDT 109° C. $T_{cr}$ 131° C. |

The above results clearly show that, when blended with talc, polymers nucleated with polymerized vinyl compounds have better properties than the pure nucleated PP polymer and the standard PP copolymer blended 3% talc.

Thus, the above results indicate that a synergistic effect on heat deflection temperature (HDT) and temperature of crystallisation (Tcr) can be obtained by blending polymerically nucleated PP and talc.

What is claimed is:

1. Polymer composition comprising
    a propylene polymer nucleated with a polymeric nucleating agent containing vinyl compound units, and
    less than 5 wt-% talc, calculated from the weight of the composition, to reduce shrinkage and to improve stiffness of the composition.

2. The polymer composition according to claim 1, wherein the propylene polymer contains about 0.0001 to 1% by weight of a vinyl compound of the formula

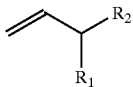

wherein $R_1$ and $R_2$ together form a 5 or 6 membered saturated or unsaturated or aromatic ring or rings or they stand independently for a lower alkyl comprising 1 to 4 carbon atoms.

3. The polymer composition according to any of claims 1 or 2, wherein said polymer nucleated with a polymeric nucleating agent comprises a propylene copolymer containing vinyl compound units.

4. The polymer composition according to claim 3, wherein the propylene polymer contains units derived from cycloalkane units, 3-methyl-1-butene, styrene, p-methylstyrene, 3-ethyl-hexane units or mixtures thereof.

5. The polymer composition according to claim 4, wherein said propylene polymer contains units selected from units derived from the group consisting of vinyl cyclohexane, vinyl cyclopentane, vinyl-2-methyl cyclohexane, vinyl norbornane and mixtures thereof.

6. The polymer composition according to claim 1, wherein said polymer nucleated with a polymeric nucleating agent comprises a propylene homo- or copolymer blended with a polymeric nucleating agent containing vinyl compound units.

7. The polymer composition according to claim 6, wherein the nucleated propylene homopolymer component of the composition exhibits a Melt Flow Rate ($MFR_2$) of 0.1 to 100 g/10 min, a Tc of over 7° C. higher than the Tc of the corresponding non-nucleated polymer, a crystallinity of over 48% and a elasticity modulus of over 2000 Mpa.

8. The polymer composition according to claim 6, wherein said copolymer is heterophasic and exhibits a tensile modulus of over 1500 MPa and a heat deflection temperature (HDT) of over 106° C.

9. The polymer composition according to claim 1, comprising 1 to less than 5 wt-% talc and exhibiting a 10% lesser shrinkage than the corresponding composition not containing talc.

10. The polymer composition according to claim 1, comprising 1 to less than 5 wt-% talc and exhibiting a 12% to 20% lesser shrinkage than the corresponding composition not containing talc.

11. A method for manufacturing polymer articles comprising subjecting the polymer composition of claim 1 to blow moulding, thermoforming moulding, injection moulding, compression moulding, sheet or film extrusion or pipe or cable extrusion to obtain an article.

12. The method according to claim 11, wherein said article is a pipe or fitting for non-pressure sewage or pressure applications.

13. The method according to claim 11, wherein a polymerized vinyl compound in said polymer composition is less than 0.01 wt-% and wherein said article is a buffer tube for optical fiber cables.

14. A process for preparing a polymer composition comprising a propylene polymer nucleated with a polymeric nucleating agent containing vinyl compound units and exhibiting reduced shrinkage and improved stiffness, characterized by blending the propylene polymer with less than 5 wt-% talc, calculated from the weight of the composition.

15. The process according to claim 14, wherein the propylene polymer is blended with 0.5 to less than 5 wt-% of talc.

16. The process according to claim 14 or 15, wherein talc is used having a particle size destribution of 0.1–10 μm.

17. The process according to claim 14, wherein 1 to less than 5 wt-% talc is blended with the propylene polymer nucleated with a polymeric nucleating agent containing vinyl compound units to provide a composition exhibiting a 10% lesser shrinkage than the corresponding composition not containing talc.

18. The polymer composition according to claim 14, wherein the propylene polymer is blended with 1 to less than 5 wt-% of talc.

19. The process according to claim 14, wherein 1 to less than 5 wt-% talc is blended with the propylene polymer nucleated with a polymeric nucleating agent containing vinyl compound units to provide a composition exhibiting 12% to 20% lesser shrinkage than the corresponding composition not containing talc.

* * * * *